United States Patent [19]

Stone

[11] 4,116,300

[45] Sep. 26, 1978

[54] VIBRATOR TILT CONTROL SYSTEM FOR VEHICLE MOUNTED SEISMIC VIBRATORS

[75] Inventor: Jacob E. Stone, Bellaire, Tex.

[73] Assignee: Exxon Production Research Company, Houston, Tex.

[21] Appl. No.: 823,570

[22] Filed: Aug. 11, 1977

[51] Int. Cl.² .............................................. G01V 1/04
[52] U.S. Cl. .................................... 181/114; 181/113
[58] Field of Search ...................... 181/113, 114, 121; 280/6.1, 6.11, 693, 698, 702, 707, 711; 180/41

[56] References Cited

U.S. PATENT DOCUMENTS

| 3,106,982 | 10/1963 | Wade | 181/114 |
|---|---|---|---|
| 3,154,320 | 10/1964 | D'Avigdor | 280/6.1 |
| 3,929,206 | 12/1975 | Bedenbender et al. | 181/114 |
| 4,011,923 | 3/1977 | Talke et al. | 181/114 |
| 4,014,403 | 3/1977 | Mifsud | 181/114 |

*Primary Examiner*—Maynard R. Wilbur
*Assistant Examiner*—Lawrence Goodwin
*Attorney, Agent, or Firm*—E. Eugene Thigpen

[57] ABSTRACT

A system for controlling the tilt of the vehicle and vibrator when the vibrator is being operated on irregular surfaces. Tilt switches detect excessive vehicle tilt. A bleeder network activated by the tilt switches reduces the pressure in the air bag on the side of the vibrator opposite from the direction of the vehicle tilt. A supply network repressurizes the air bag on the side of the vibrator opposite from the direction of the tilt.

9 Claims, 4 Drawing Figures

VIBRATOR TILT CONTROL SYSTEM FOR VEHICLE MOUNTED SEISMIC VIBRATORS

BACKGROUND OF THE INVENTION

1. Field of the Invention

The present invention relates to vibratory seismic energy sources used for seismic prospecting. More particularly, it relates to a system for controlling the tilt of a vehicle upon which a seismic vibrator may be mounted.

2. Description of the Prior Art

In seismic prospecting, it has become common to use, as a seismic wave source, an electrohydraulically controlled vibratory source, more simply referred to as a vibrator.

Typically, a vibrator comprises a double-ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder, thereby imparting a reciprocating motion to the piston relative to the reaction mass. The piston rod extending from the reaction mass is rigidly coupled to a ground coupling plate (hereinafter baseplate) which is maintained in intimate contact with the earth material. The inertia of the reaction mass tends to resist displacement of the reaction mass relative to the earth. The motion of the piston is coupled through the piston rod and baseplate to impart vibratory seismic energy in the earth.

Typically, a vibrator is vehicle mounted. Upon arrival at a selected location, the baseplate is lowered into contact with the earth's surface, and to prevent decoupling of the baseplate from the ground during operation, a portion of the vehicle's weight is applied to the baseplate. The weight of the vehicle is frequently applied to the baseplate through one or more spring members so that a static bias force is imposed on the baseplate while the dynamic forces of the baseplate are decoupled from the vehicle. The spring members are usually in the form of rubber air bags filled with compressed air.

As frequently occurs in seismic exploration, the baseplate will be positioned on sloping terrain such that during operation of the vibrator one side of the vehicle will be at a higher elevation than the other side. Under such conditions, the vehicle and the vibrator will be tilted in the direction of the slope. Where the slope is relatively slight, the tilt produced by the surface irregularity is compensated for by the compliancy of the air bags. At some point, however, the degree of slope will be so severe that the center of gravity of the vehicle will shift far enough in the direction of the tilt so as to cause the vehicle to roll over. The vehicle will tend to remain stable as long as a vertical line drawn through the center of gravity of the vehicle intersects the plane formed by the ground coupling surface of the baseplate. Thus, the likelihood of vehicle roll-over increases as the surface area of the baseplate is reduced.

The current method utilized to prevent vehicle roll over, when the vibrator is being positioned on sloping terrain, is to operate the vibrator with the rear wheels of the vehicle in contact with the earth's surface. This maintains the vibrator in a stable condition, but reduces the bias force applied to the baseplate, which has the undesirable effect of reducing the amount of seismic energy the vibrator is capable of imparting into the earth. This follows from the fact that when the magnitude of the bias force applied to the baseplate is reduced, a smaller upward force will result in decoupling of the baseplate from the earth's surface. When the baseplate is not in contact with the earth's surface, seismic energy can not be imparted into the earth. Decoupling also produces distortion in the injected energy pattern.

SUMMARY OF THE INVENTION

This invention is a vibrator tilt control system for vehicle mounted seismic vibrators. The system controls the tilt of the vibrator and vehicle when the vibrator is being operated on irregular surfaces such that one side of the vehicle is at a higher elevation than the other side. When operating on such irregular surfaces, the center of gravity of the vehicle will shift in the direction of the vehicle tilt, and when the vehicle is raised off the ground, the center of gravity will further shift in the direction of the vehicle tilt.

In a preferred embodiment, the weight of a heavy mass, such as the vehicle, is supported on a support structure and applied to the baseplate through air bags, which are affixed between the support structure and the baseplate. The air bags are positioned on the baseplate such that at least one bag is positioned on the right and left sides of the vibrator. A tilt switch automatically detects excessive vehicle tilt. A bleeder network which is activated by the tilt switch reduces the pressure in the air bag on the side of the vibrator opposite from the direction of tilt.

When the baseplate is raised into its transport position, a supply network re-pressurizes the air bag on the side of the vibrator opposite from the direction of tilt to its normal operating pressure.

By reducing the pressure in the air bag on the side of the vibrator opposite from the direction of tilt, the amount of vehicle tilt is reduced. This reduces the danger of vehicle rollover and the possibility of damage to the vehicle, vibrator and operator.

DESCRIPTION OF THE PREFERRED EMBODIMENT

Figure 1:
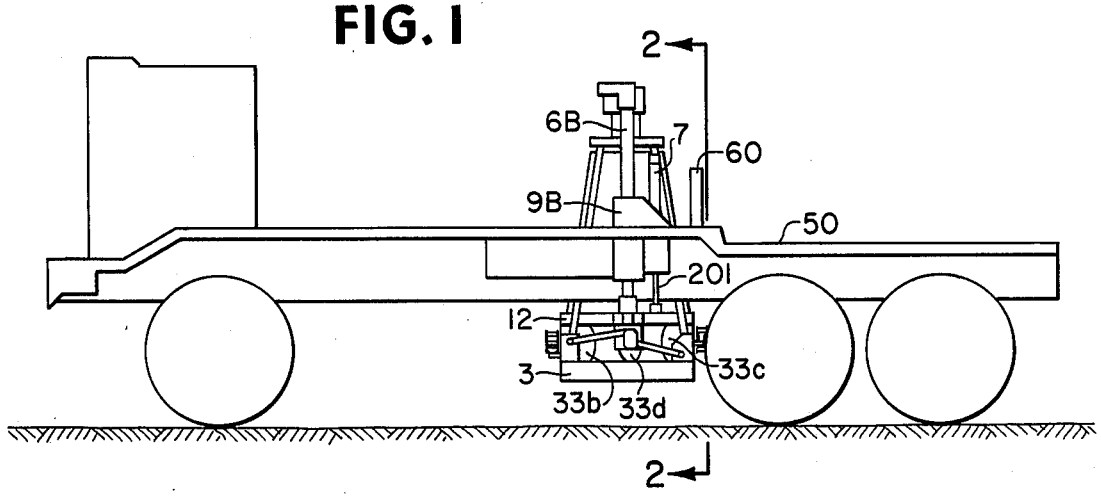
FIG. 1 is a side view illustrating a vibrator mounted on a vehicle.
Figure 2:
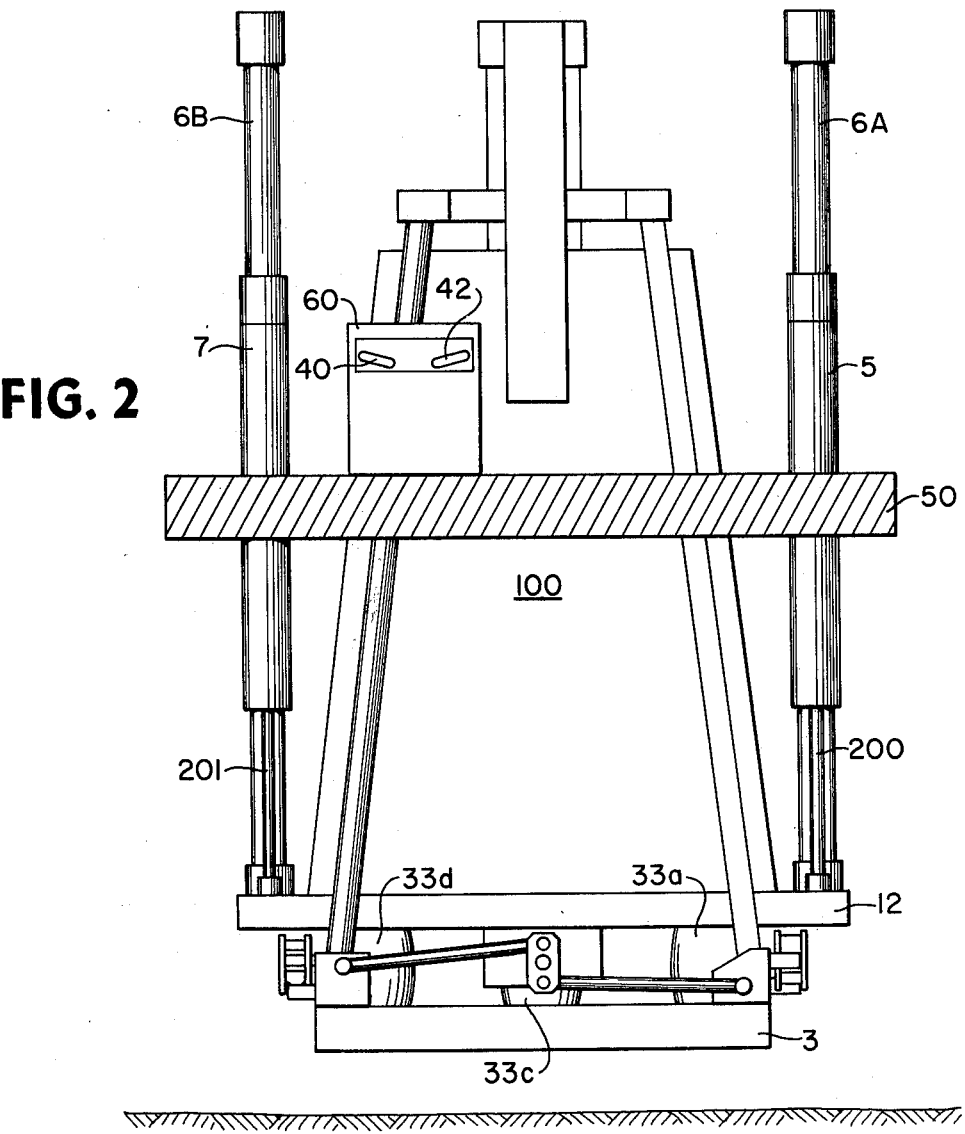
FIG. 2 is a cross-section view along the plane formed by Line 2—2.

FIGS. 1 and 2 show baseplate 3 of a seismic vibrator. The vibrator may be of a type known to those familiar with the prior art; therefore, many details of the structure are not included in the drawings. Normally, however, the baseplate is driven by a hydraulic drive mechanism comprising a driving piston reciprocally mounted within a cylinder bore and a piston rod. The lower end of the piston rod is affixed to the center of the baseplate.

Hydraulic lift cylinders 5 and 7 (see FIGS. 1 and 2) transfer the weight of the vehicle to a support structure such as hold-down plate 12. Hold-down plate 12 extends beneath the reaction mass 100 and rests upon four air bags 33a, 33b, 33c, 33d, which are affixed between the hold-down plate and baseplate 3. If baseplate 3 is square in shape, the air bags 33a, 33b, 33c, and 33d may be arranged on the baseplate in a diamond pattern. Air bag 33a is positioned on the right side of the baseplate and air bag 33d is positioned on the left side of the baseplate. Air bag 33b is positioned on the front of the baseplate and air bag 33c is positioned on the rear of the baseplate.

The hydraulic lift cylinders 5 and 7 control the vertical position of the vibrator relative to the vehicle. The cylinder housings of lift cylinders 5 and 7 are affixed to the vehicle frame and the piston rods thereof are affixed to the hold-down plate. When hydraulic fluid is pumped into the upper portion to lift cylinders 5 and 7, the pistons are forced down relative to the cylinders and the vibrator is lowered to the ground. After the baseplate is lowered to the earth's surface, if additional hydraulic fluid is pumped into the upper portion of lift cylinders 5 and 7, the vehicle will be lifted off the ground and its weight will bear on the hold-down plate thus applying the weight of the heavy mass to the baseplate. The air bags which connect the hold-down plate with the baseplate transmit the weight of the vehicle to the baseplate. The vehicle is lowered back to the ground and the baseplate is lifted off the ground by pumping hydraulic fluid into the lower portion of lift cylinders 5 and 7. Guide rods 6A and 6B (see FIGS. 1 and 2), which laterally maintain the baseplate in position relative to the center of the vehicle, slide through cylindrical bores in guide frames 9A and 9B (9A is not shown) which are rigidly affixed to opposite sides of the transport vehicle.

If the vehicle is positioned on a sloping surface such that one side of the vehicle is at a higher elevation than the other side, the vibrator and the vehicle will be inclined in the direction of the slope, and the center of gravity of the vehicle will shift in the direction of the slope. Likewise, should the baseplate 3 be resting upon a protruding rock or log when the weight of the vehicle is applied to the baseplate, the vehicle and the vibrator will be tilted to one side. The direction of tilt will either be to the right or to the left, depending upon the direction of the slope of the surface irregularity. When the vehicle is raised off the ground so as to apply its weight to the baseplate, the center of gravity of the vehicle will further shift in the direction of slope creating the possibility that the vehicle will roll over to one side. This obviously makes it impossible to continue seismic operations and endangers the operator, the vehicle and the vibrator.

A baseplate is typically rectangular in shape. Some vibrators, however, may utilize a baseplate which has a square or circular shape with a surface area substantially less than that of a typical rectangular baseplate. The reduced area of the baseplate will make the vehicle much more likely to be unstable when the vibrator is being operated on uneven surfaces. This occurs because the vehicle will tend to remain in a stable condition so long as a vertical line drawn through the center of gravity of the vehicle intersects the plane formed by the ground contacting surface of the baseplate.

The vibrator tilt control system of this invention stabilizes the vehicle in situations where the vibrator is being positioned on uneven terrain such that one side of the vehicle is at a higher elevation than the other side. This is accomplished by detecting the direction in which the vibrator and vehicle are tilted and then reducing the pressure in the air bag, either right air bag 33a or left air bag 33d (see FIGS. 1 and 2), on the side of the vibrator opposite the direction of the tilt.

Tilt sense switches 40 and 42 (see FIG. 2) detect the direction of excessive vehicle tilt. The tilt switches are conventional mercury switches, such as a Grigsby-Barton Reedac mercury switch HG-252-LO. If the vehicle is tilted to the right, switch 42 will close, and conversely if the vehicle is tilted to the left, switch 40 will close. The mercury pool in the switches travels in the direction of the vehicle tilt thus closing the switch in response to the direction of the vehicle tilt. The tilt switches are mounted on vehicle bed 50 near the center thereof, and may be mounted in control panel 60.

Switches 40 and 42 will close at a certain degree of vehicle tilt. The point at which the switches will close depends upon the angle at which the switches are mounted in panel 60. The greater the inclination from a vertical mounting position the less the vehicle has to tilt to close the switches. Conversely, the nearer the switches are to being mounted in a vertical position the greater the vehicle tilt required to close them.

Figure 3:
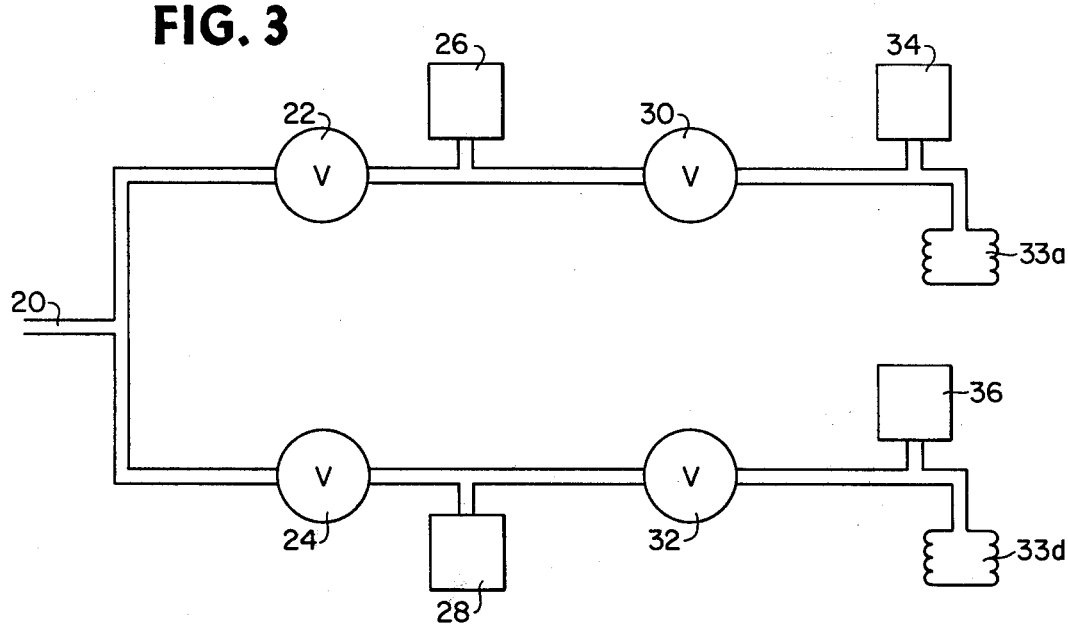
FIG. 3 is a mechanical block diagram which illustrates apparatus useful in practicing the invention.

FIG. 3 is a mechanical block diagram which illustrates the tilt control system which controls the air pressure in the right and left air bags 33a and 33d, respectively. A source of compressed air 20 supplies compressed air to right air bag 33a and left air bag 33d through supply valves 22 and 24, respectively. Pressure switch 26 senses the pressure in air bag 33a and closes valve 22 when the pressure therein reaches its normal operating pressure. Likewise, pressure switch 28 senses the pressure in air bag 33d and closes valve 24 when the pressure therein reaches its predetermined normal pressure. In a preferred embodiment, utilized with a vehicle and vibrator having an approximate weight of 50,000 pounds, the air bags are Goodyear Air Springs Model GYRL-1300 which are normally maintained at a pressure of approximately 105 psig.

Bleed valves 30 and 32 act to reduce the pressure in right air bag 33a and left air bag 33d, respectively, in response to the direction of the tilt of the vehicle; that is, pressure in the air bag positioned on the side of the vibrator opposite from the direction of tilt will be reduced. Empirically, for the vibrator of the preferred embodiment, it has been determined that to stabilize the vibrator when it is tilted, the pressure in the air bag positioned on the side of the vibrator opposite the direction of tilt, the uphill air bag, should be reduced to approximately 50 psig. Low pressure switch 34 therefore senses the pressure in air bag 33a and closes valve 30 when the pressure therein reaches 50 psig, assuming that air bag 33a is positioned on the uphill side of the vibrator. Likewise, low pressure switch 36 senses the pressure in air bag 33d and closes valve 32 when the pressure therein reaches 50 psig.

Valves 22 and 24 are conventional solenoid valves which may be a Skinner LC2DB4150 valve. Similarly, valves 30 and 32 are conventional solenoid valves which may also be a Skinner LC2DB4150 valve. The pressure switches 26, 28, 34 and 36 are commerically available units such as an ASCO TRIPOINT pressure switch SB11A.

Figure 4:
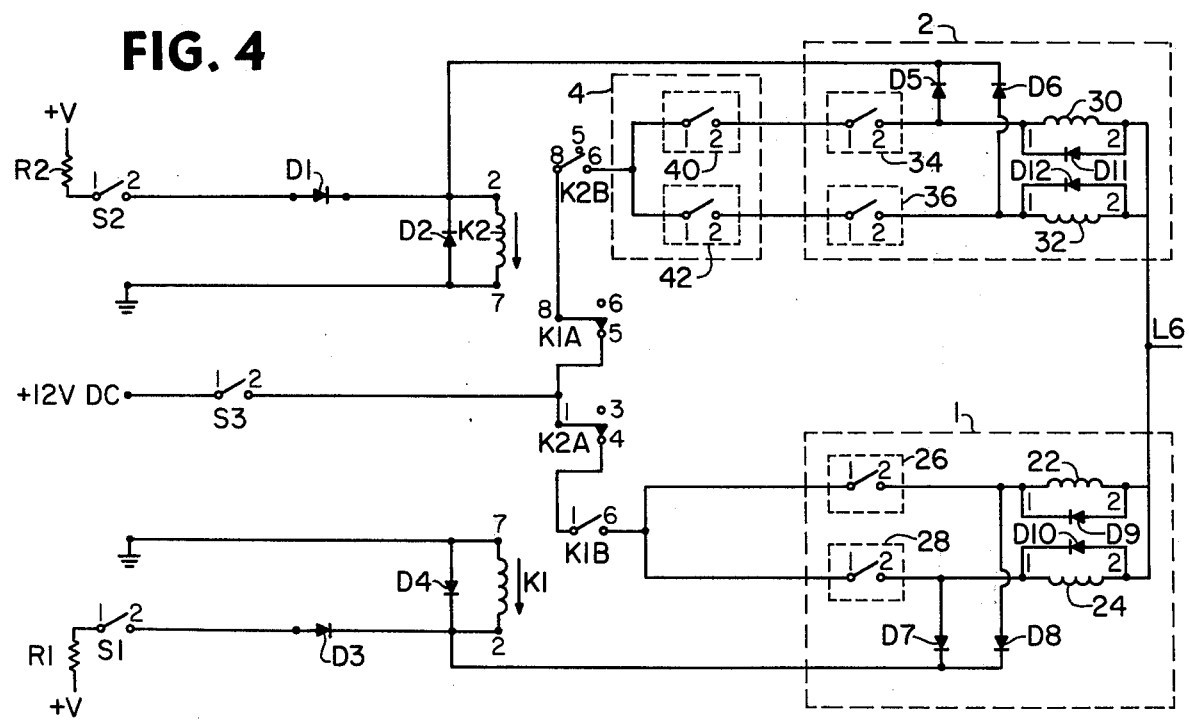
FIG. 4 is an electrical schematic which illustrates apparatus useful in practicing the invention.

The preferred circuit for the vibrator tilt control is shown in FIG. 4. It includes a supply section indicated generally by numeral 1, a bleeder section indicated generally by numeral 2, and tilt section indicated by numeral 4.

Power for the vibrator tilt control circuit is +12v D.C. supplied on line 1, through switch S3. Terminal 1 of switch S3 is connected to the +12v D.C. source, which may be the vehicle's battery, and terminal 2 of switch S3 is connected to terminal 1 of contact K2A of relay K2 and to terminal 5 of contact K1A of relay K1. Terminal 8 of contact K2B of relay K2 is connected to terminal 8 of contact K1A. Terminal 4 of contact K2A is connected to terminal 1 of contact K1B of relay K1.

Terminal 1 of the baseplate down control switch S2 is connected to voltage source V through resistor R2, and terminal 2 of switch S2 is connected to the plus (+) terminal of diode D1. The minus (−) terminal of diode D1 is connected to the minus (−) terminals of diodes D2, D5 and D6 and to terminal 2 of relay K2. Terminal 7 of relay K2 and the plus (+) terminal of diode D2 are connected to ground.

Terminal 1 of the baseplate up control switch S1 is connected to voltage source V through resistor R1, and terminal 2 of switch S1 is connected to the plug (+) terminal of diode D3. The minus terminal of diode D3 is connected to the minus (−) terminals of diodes D4, D7, and D8 and to terminal 2 of relay K1. Terminal 7 of relay K1 and the plus (+) terminal of diode D4 are connected to ground.

Supply section 1 of the vibrator tilt control circuit primarily comprises supply valves 22 and 24 and pressure switches 26 and 28. Terminal 6 of contact K1B is connected to terminal 1 of pressure switch 26 and to terminal 1 of pressure switch 28. Terminal 2 of pressure switch 26 is connected to the plus (+) terminal of diode D8, terminal 1 of supply valve 22, the minus (−) terminal of diode D9. Terminal 2 of pressure switch 28 is connected to the plus (+) terminal of D7, terminal 1 of supply valve 24, the minus terminal of diode D10. Terminal 2 of supply valve 22 is connected to terminal 2 of supply valve 24, the plug (+) terminals of diodes D9 and D10, and line 16.

Also connected at line L6 are the plus (+) terminals of diodes D11 and D12, terminal 2 of bleed valve 30, and terminal 2 of bleed valve 32. The bleed valves and low pressure switches 34 and 36 primarily comprise bleeder section 2 of the vibrator tilt control circuit. Bleed valve 30 has a terminal 1 connected to the minus (−) terminal of diode D11, the plug (+) terminal of diode D5, and to terminal 2 of low pressure switch 34. Bleed valve 32 has its terminal 1 connected to the minus (−) terminal of diode D12, the plus (+) terminal of diode D6, and to terminal 2 of low pressure switch 36. Terminal 1 of low pressure switch 36 is connected to terminal 2 of tilt switch 42, and terminal 1 of low pressure switch 34 is connected to terminal 2 of tilt switch 40.

The tilt section 4 of this circuit includes tilt switches 40 and 42, with terminal 1 of tilt switch 40 and terminal 1 of tilt switch 42 being connected to terminal 6 of contact K2B.

Under normal operating conditions, switch S3 will be closed energizing the vibrator tilt control circuit of FIG. 4. Upon arrival at a selected location, the operator will lower the vibrator baseplate to the ground by enabling baseplate down control switch S2. This energizes relay K2 which closes contact K28 and opens contact K2A, contact K2A being normally closed. Contact K2A is opened so as to prevent energization of supply network 1 during lowering of the baseplate. Contact K2B is closed so as to allow energization of bleeder network 2 through tilt network 4.

Should the vehicle be positioned on a surface which slopes downwardly from left to right, for example, or should the baseplate 3 come into contact with some surface irregularity, such as a rock or a log, with a similar slope, the center of gravity of the vehicle and the vibrator will tend to shift to the right. When the vehicle is raised off the ground, the center of gravity of the vehicle will further shift in the direction of the tilt, that is, to the right. If the slope is severe enough, there is a possibility that the vehicle will actually roll over on its downhill side. To reduce the possibility of vehicle rollover, the vibrator tilt control system of this invention will reduce the pressure in the air bag on the side of the vibrator opposite the direction of the tilt, here this would be left air bag 33d. Reducing the pressure in uphill air bag 33d will tend to stabilize the vibrator during operation.

When the left side of the vehicle is at a higher elevation than the right side of the vehicle and the vehicle is tilted excessively, tilt switch 42 will close. When tilt switch 42 closes, bleeder valve 32 will open. The function of bleeder valve 32 is to reduce the pressure in the left air bag 33d, which is the uphill air bag in this situation. Low pressure switch 36, which is normally closed at a pressure above 50 psig, will open when the pressure in air bag 33d is reduced to approximately 50 psig, preventing any further pressure reduction in air bag 33d. In this mode of operation, the uphill air bag 33d will be at a pressure of approximately 50 psig and the downhill air bag 33a will be at a pressure of approximately 105 psig.

Prior to moving the vehicle, the baseplate will be raised into its traveling position by closing switch S1. This will energize relay K1 which will close contact K1B and open contact K1A, K1A being normally closed. When contact K1A is open, it is impossible to energize bleeder network 2 because these is now no current path from the +12V D.C. source to the bleeder network (see FIG. 4). Supply network 1, however, will be energized since contact K1B is closed, allowing current to flow from the +12v D.C. source to the supply network 1.

The function of the supply network is to re-pressurize the depressurized air bag when the baseplate is raised off the ground and into its traveling position. In the above example, the depressurized air bag is left air bag 33d. In supply network 1, pressure switches 26 and 28 are normally closed at low pressure, that is, a pressure below approximately 105 psig. Thus, since the pressure in air bag 33d is at approximately 50 psig, pressure switch 28 will be closed and will activate supply valve 24. Supply valve 24 will re-pressurize left air bag 33d to its normal operating pressure of approximately 105 psig. Upon reaching this pressure, switch 28 will open, preventing further compressed air from being fed into air bag 33d.

If the vibrator should be positioned on a surface or surface irregularity which slopes downwardly from right to left, then the uphill air bag will be right air bag 33a. The baseplate will be lowered into contact with the earth's surface by closing switch S2, which activates relay K2 which causes contact K2B to close and contact K2A to open. Again if the slope is severe enough, tilt switch 40 will close, energizing bleeder circuit 2. This will cause bleed valve 30 to open, reducing the pressure in air bag 33a to approximately 50 psig. When that pressure is reached, low pressure switch 34 will open, preventing further reduction in the pressure in air bag 33a.

Prior to moving the vehicle, switch S1 will be closed so as to raise the baseplate off the ground and into position for transport. Switch S1 activates relay K1 which causes contact K1B to close and contact K1A to open As discussed above, this permits energization of supply network 1. The pressure switches are normally closed at low pressure. Therefore since the pressure in the uphill air bag 33a, is at 50 psig, pressure switch 26 will be closed. Pressure switch 26 will activate supply valve 22 which will supply compressed air to air bag 33a until a pressure of approximately 105 psig is reached. When this happens, low pressure switch 26 is opened, preventing any further air from entering air bag 33a. All air bags are now at the normal operating pressure of 105 psig and are ready for transport to the next field location.

With reference to FIG. 4, diodes D1 and D3 function as reverse current protectors. Diodes D1 and D3 will prevent current from flowing from the vibrator tilt control circuit to the vibrator control circuits through switches S2 and S1, respectively, should the voltage in the vibrator tilt control circuit be greater than the voltage in the vibrator control curcuits. Diodes D9, D10, D11 and D12 shunt valves 22, 24, 30 and 32, respectively, and provide a discharge path for the inductive current generated by the collapsing magnetic field of the respective coils. Similarly, diodes D2 and D4 shunt relays K2 and K1, respectively. If tilt switch 42 is closed, diode D6 forms feedback circuit which latches in relay K2. Likewise if tilt switch 40 is closed, diode D5 forms a feedback circuit which latches in relay K2. Similarly, diodes D7 and D8 will latch in relay K1, the particular feedback circuit depending upon whether switch 26 or 28 is closed.

The foregoing disclosure and description of the present invention is illustrative and explanatory thereof and variations and changes in the size, shape and materials as well as in details of the preferred embodiment may be made without departing from the spirit and scope of the invention.

What I claim is:

1. In a vibratory seismic energy source adapted to be transported on a vehicle wherein seismic energy is coupled to the ground by means of a baseplate and wherein at least a portion of the weight of said vehicle is applied to said baseplate through a support structure positioned above said baseplate and wherein air bags couple substantially vertical forces from said support structure to said baseplate, said air bags being positioned on said baseplate such that at least one air bag is located on each of the two opposite sides of said seismic energy source, an improved tilt control means for controlling the tilt of said vehicle which comprises:
   tilt means for detecting the direction of tilt of said vehicle; and
   bleeder means responsive to said tilt means for selectively decreasing the pressure in the air bag located on the side of said seismic energy source opposite the direction of tilt of said vehicle.

2. The apparatus of claim 1 wherein said tilt means comprises a pair of mercury switches mounted on said vehicle near the center thereof for detecting the direction of tilt of said vehicle.

3. The apparatus of claim 1 wherein said bleeder means further includes means for regulating the extent of said pressure reduction.

4. The apparatus of claim 1 wherein one air bag is positioned on the right side of said seismic energy source and one air bag is positioned on the left side of said seimic energy source and said bleeder means comprises:
   a first bleed valve connected to said right air bag and a second bleed valve connected to said left air bag reducing the pressure in said air bags in response to said tilt means; and
   a pressure switch connected to said first bleed valve and a second pressure switch connected to said second bleed valve for regulating the extent of pressure reduction in said air bags, said bleed valves being connected to said tilt means through said pressure switches.

5. The apparatus of claim 1 further including supply means, which comprises:
   first means for increasing the pressure in the air bag on the side of the seismic energy source opposite the direction of tilt of the vehicle; and
   second means for regulating the extent of pressure increase in the air bag positioned on the side of the seismic energy source opposite the direction of tilt of the vehicle.

6. The apparatus of claim 5 wherein one air bag is positioned on the right side of said seismic energy source and one air bag is positioned on the left side of said seismic energy source and said first means comprises a first supply valve connected to said right air bag and a second supply valve connected to said left air bag.

7. The apparatus of claim 5 wherein one air bag is positioned on the right side of said seismic energy source and one air bag is positioned on the left side of said seismic energy source and said second means comprises a pressure switch connected to said first supply valve and a second pressure switch connected to said second supply valve.

8. A method for controlling the tilt of a vehicle upon which a vibratory siesmic energy source is mounted wherein seismic energy is coupled to the ground by means of a baseplate and wherein at least a portion of the weight of said vehicle is applied to said baseplate through a support structure positioned above said baseplate and wherein air bags couple substantially vertical forces from said support structure to said baseplate, said air bags being positioned on said baseplate such that at least one air bag is located on each of the two opposite side of said seismic energy source, which comprises:
   detecting the direction of tilt of said vehicle; and
   decreasing the pressure in the air bag on the side of the seismic energy source opposite the direction of tilt of said vehicle.

9. The method of claim 8 further comprising:
   increasing the pressure in the air bag on the side of the seismic energy source opposite the direction of tilt of said vehicle when said baseplate is raised into position for transport.

* * * * *